(12) United States Patent
MacFarlane et al.

(10) Patent No.: US 8,019,065 B2
(45) Date of Patent: Sep. 13, 2011

(54) COMMUNICATION DEVICE WITH CAPABILITY FOR HANDLING CONDITIONAL ACCEPTANCE OF MEETING REQUESTS

(75) Inventors: David V. MacFarlane, Waterloo (CA); Neil P. Adams, Waterloo (CA); Christopher R. Wormald, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1246 days.

(21) Appl. No.: 11/133,446

(22) Filed: May 20, 2005

(65) Prior Publication Data
US 2007/0008911 A1    Jan. 11, 2007

(51) Int. Cl.
*H04M 3/42* (2006.01)
*G06Q 10/00* (2006.01)

(52) U.S. Cl. .............. 379/201.01; 379/202.01; 705/5; 705/6; 705/7.18; 705/7.19

(58) Field of Classification Search .............. 705/5, 6, 705/8, 9, 7.18, 7.19; 379/201.01, 202.01
See application file for complete search history.

(56) References Cited

U.S. PATENT DOCUMENTS

| | | | | |
|---|---|---|---|---|
| 5,070,470 A * | 12/1991 | Scully et al. | ...... | 705/8 |
| 5,303,145 A * | 4/1994 | Griffin et al. | ...... | 705/9 |
| 7,108,173 B1 * | 9/2006 | Wang et al. | ...... | 705/5 |
| 2004/0064355 A1 | 4/2004 | Dorenbosch et al. | | |

FOREIGN PATENT DOCUMENTS

WO    WO 01/37541 A2    5/2001

OTHER PUBLICATIONS

EPO Search Report dated Jul. 21, 2005.
EPO Examination Report dated Jul. 10, 2006.

* cited by examiner

*Primary Examiner* — Ahmad F Matar
*Assistant Examiner* — Nafiz E Hoque
(74) *Attorney, Agent, or Firm* — Geoffrey deKleine; Borden Ladner Gervais LLP

(57) ABSTRACT

Interacting digitally communicating devices cooperate to schedule future meetings include a capability to handle conditional acceptance of meeting requests. For example, a conditional acceptance may be subject to Boolean logic functions of the acceptance status(es) of other meeting invitees (e.g., the condition that another specific one or more invitees also accept the meeting request).

11 Claims, 5 Drawing Sheets

MEETING STATUS DATA

| | MTG ID | INVITEES | STATUS |
|---|---|---|---|
| T1 | A | Bob | Organizer |
| | A | Alice | |
| | A | Eve | |
| | A | Carol | |

⇓

| | MTG ID | INVITEES | STATUS |
|---|---|---|---|
| T2 | A | Bob | Organizer |
| | A | Alice | Declined |
| | A | Eve | |
| | A | Carol | Conditional (Eve) |

IF EVE ACCEPTS ⇙       IF EVE DECLINES ⇘

| | | | | | | |
|---|---|---|---|---|---|---|
| T3 | A | Bob | Organizer | A | Bob | Organizer |
| | A | Alice | Declined | A | Alice | Declined |
| | A | Eve | Accepted | A | Eve | Declined |
| | A | Carol | Accepted | A | Carol | Declined |

MEETING STATUS DATA

| | MTG ID | INVITEES | STATUS |
|---|---|---|---|
| T1 | A | Bob | Organizer |
| | A | Alice | |
| | A | Eve | |
| | A | Carol | |

⇓

| | MTG ID | INVITEES | STATUS |
|---|---|---|---|
| T2 | A | Bob | Organizer |
| | A | Alice | Declined |
| | A | Eve | |
| | A | Carol | Conditional (Eve) |

IF EVE ACCEPTS ⇙     IF EVE DECLINES ⇘

| | | | | | | | |
|---|---|---|---|---|---|---|---|
| T3 | A | Bob | Organizer | | A | Bob | Organizer |
| | A | Alice | Declined | | A | Alice | Declined |
| | A | Eve | Accepted | | A | Eve | Declined |
| | A | Carol | Accepted | | A | Carol | Declined |

*Fig. 5*

| A = Accept : if and only if LF(B,C) = T ||||
|---|---|---|---|
| Logical Function | Party B | Party C | Party A |
| AND | T | T | Declines |
| NAND | T̄ | T̄ | Accepts |
| OR | T | T̄ | Accepts |
| NOR | T | T | Accepts |
| NOR | T | T̄ | Declines |
| ⋮ | ⋮ | ⋮ | ⋮ |

COMMUNICATION DEVICE WITH CAPABILITY FOR HANDLING CONDITIONAL ACCEPTANCE OF MEETING REQUESTS

BACKGROUND

1. Technical Field

This application generally relates to communication devices having a user capability to participate in scheduling of future meetings with other device users. It has particular applicability to wireless communication devices.

2. Related Art

Computerized scheduling calendars are now commonplace. In a wired and/or wireless network of computers or computerized communication devices, such personal scheduling calendars may be interactive. That is, a meeting organizer may invite one or more other device users to a future meeting at a particular day and time (and perhaps place). In some circumstances, when such invitations are received they may be automatically acted upon by suitable software agents or modules so as to simply accept such an invitation if other entries on the invitee's calendar permit acceptance. If the invitee's calendar does not permit the proposed meeting, then a denial message may be returned to the meeting organizer. Of course, each individual calendar may be set up by its user so as to block out certain segments of time and/or to require incoming requests to be screened by the user personally before a response is manually made to an incoming request.

Current options for accepting a meeting request from a handheld wireless communication device are to accept or tentatively accept the request. There is no convenient method for an invitee to conditionally accept a meeting request (e.g., based on the response of another invitee).

For example, assume that Bob sends a meeting request to Alice, Eve, and Carol. Further assume that Carol is very busy and only wishes to attend the meeting if Eve attends. There is currently no method for Carol to indicate that her attendance is dependent on Eve's attendance, thus she must first speak to Eve to determine if she will attend and then choose "Tentative" or "Accept". Clearly, this method is slow and inconvenient.

BRIEF DESCRIPTION OF THE DRAWINGS

These and other objects and advantages of this arrangement will be better understood and appreciated in conjunction with the following detailed description of exemplary embodiments taken together with the accompanying drawings, in which:

FIG. 5 is an exemplary abbreviated depiction of a meeting status table demonstrating how it can change as a result of handling conditional acceptances; and.

FIG. 6 is an abbreviated table of exemplary Boolean logic functions that might be used to condition the acceptance of one party A upon a logic function of the acceptance of other parties invited to a meeting.

DETAILED DESCRIPTION OF EXEMPLARY EMBODIMENTS

We now introduce "Conditional" option for accepting a meeting request. If an invitee selects "Conditional" acceptance then she is presented with the full list of invitees and must select those whose attendance will determine her attendance. The meeting is entered into the invitee's calendar as Tentative and the Conditional response is sent to the meeting organizer.

Since the meeting organizer receives all responses to the request, her device must track all Conditional responses. If all conditions of a Conditional response are satisfied (or explicitly dissatisfied) then the organizer's handheld sends an update to the corresponding invitee. When the invitee's handheld receives the update it then marks the meeting in the invitee's calendar as Accepted if all conditions were satisfied (or it declines the meeting and deletes it from the invitee's calendar if all conditions were explicitly dissatisfied).

For example, assume that Bob sends a meeting request to Alice, Eve, and Carol. Further assume that Carol sends a Conditional response based on Eve accepting the request, and the meeting is entered into Carol's calendar as Tentative. Bob's handheld receives the Conditional response. Later on, Eve accepts the request and an Accept response is sent to Bob. Bob's handheld determines that Carol's conditional response has been satisfied and sends a notification to Carol. Carol's handheld receives the notification and changes the meeting in her calendar from Tentative to Accepted. Note that if Eve had declined the meeting a notification to that effect would have been sent to Carol and Carol's handheld would have then declined the meeting and deleted it from her calendar.

Other logical options may also be defined for a Confidential acceptance. For example, if Bob is setting up a meeting and needs somebody from Product Marketing to attend, A and B work in product marketing and they both get an invitation. Only one of them needs to go. B could go but doesn't want to if A is going so B goes if A isn't going (i.e., a non-exclusive OR or NOR logic condition is defined. This is, arguably, the inverse of the earlier described example where if A goes then B goes and if A doesn't go then B doesn't go. The NOR example extends this to cover the situation where if A goes, B doesn't go and A doesn't go then B goes. This would extend beyond a group of 2 people and to other possible logical functions as will be appreciated.

The capabilities here described may be embodied in hardware, software or a combination of hardware and software and also provide a method for a device user to conditionally accept a meeting request received via a wireless communication device—and/or to organize a meeting in a way that accommodates such conditional acceptances. The exemplary embodiment is realized at lest in part, by executable computer program code which may be embodies in physical program memory media.

Figure 1:
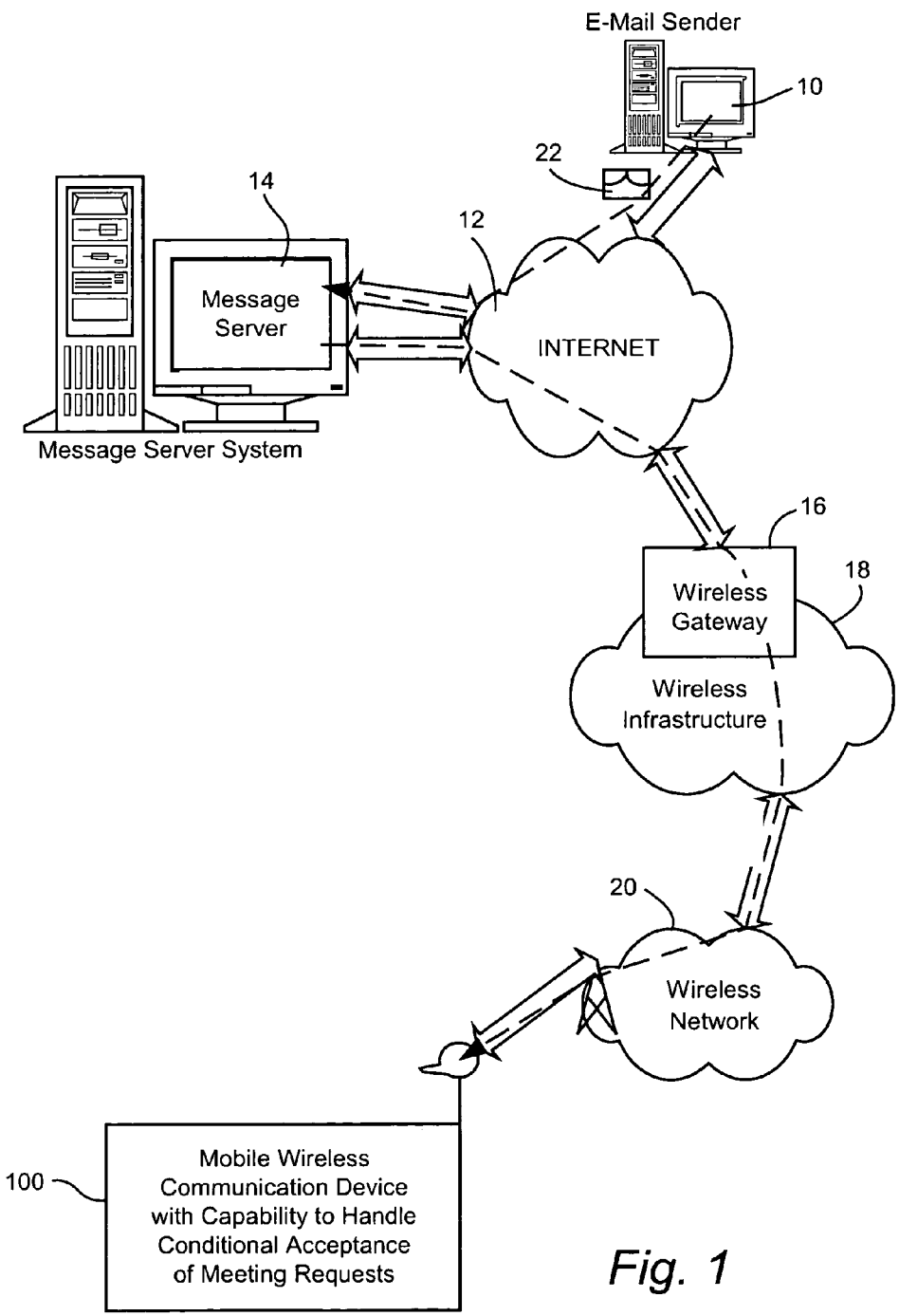
FIG. 1 is an overall system wide schematic view of an exemplary wireless email communication system incorporating a mobile wireless communication device with capability for handling conditional acceptance of meeting requests in accordance with one exemplary embodiment.

FIG. 1 is an overview of an exemplary communication system in which a wireless communication device 100 may be used. One skilled in the art will appreciate that there may be hundreds of different system topologies. There may also be many message senders and recipients. The simple exemplary system shown in FIG. 1 is for illustrative purposes only, and shows perhaps the currently most prevalent Internet email environment.

FIG. 1 shows an email sender 10, the Internet 12, a message server system 14, a wireless gateway 16, wireless infrastructure 18, a wireless network 20 and a mobile communication device 100.

An email sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead by connected to a wide area network (WAN) other than the Internet, although email transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for email exchange over the Internet 12. Although other messaging systems might not require a message server system 14, a mobile device 100 configured for receiving and possibly sending email will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the system described below. Message servers such as server 14 typically extend beyond just email sending and receiving; they also include dynamic database storage engines that have predefined database formats for data like calendars, to-do lists, task lists, email and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed email message 22 is sent by the email sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message sever 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific email address associated with the mobile device 100. In a preferred embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Divisional Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric networks include the Mobitex™ Radio Network and the DataTAC™ Radio Network. Examples of older voice-centric data networks include Personal Communication Systems (PCS) networks like GSM, and TDMA systems.

Figure 2:
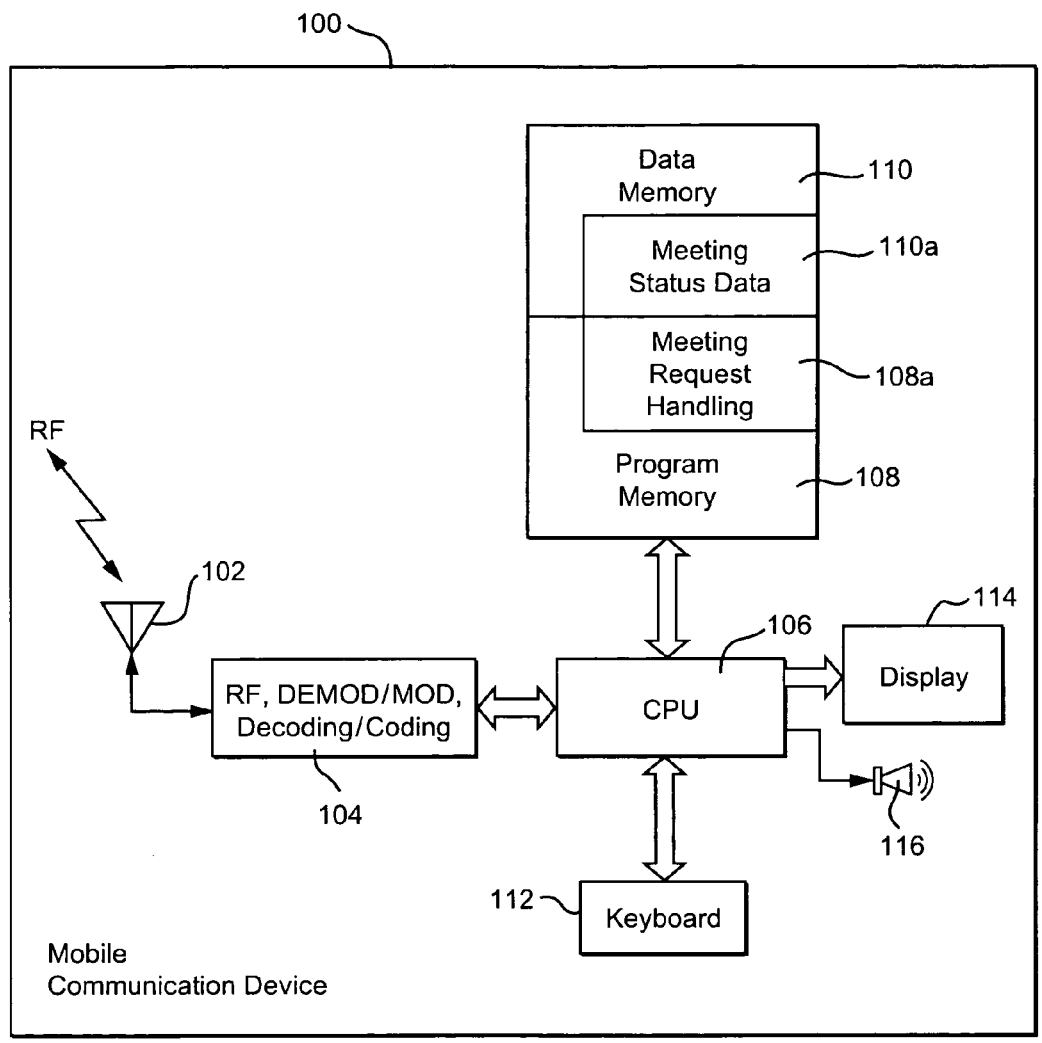
FIG. 2 is an abbreviated schematic diagram of hardware included within an exemplary mobile wireless communication device.
Figure 3:
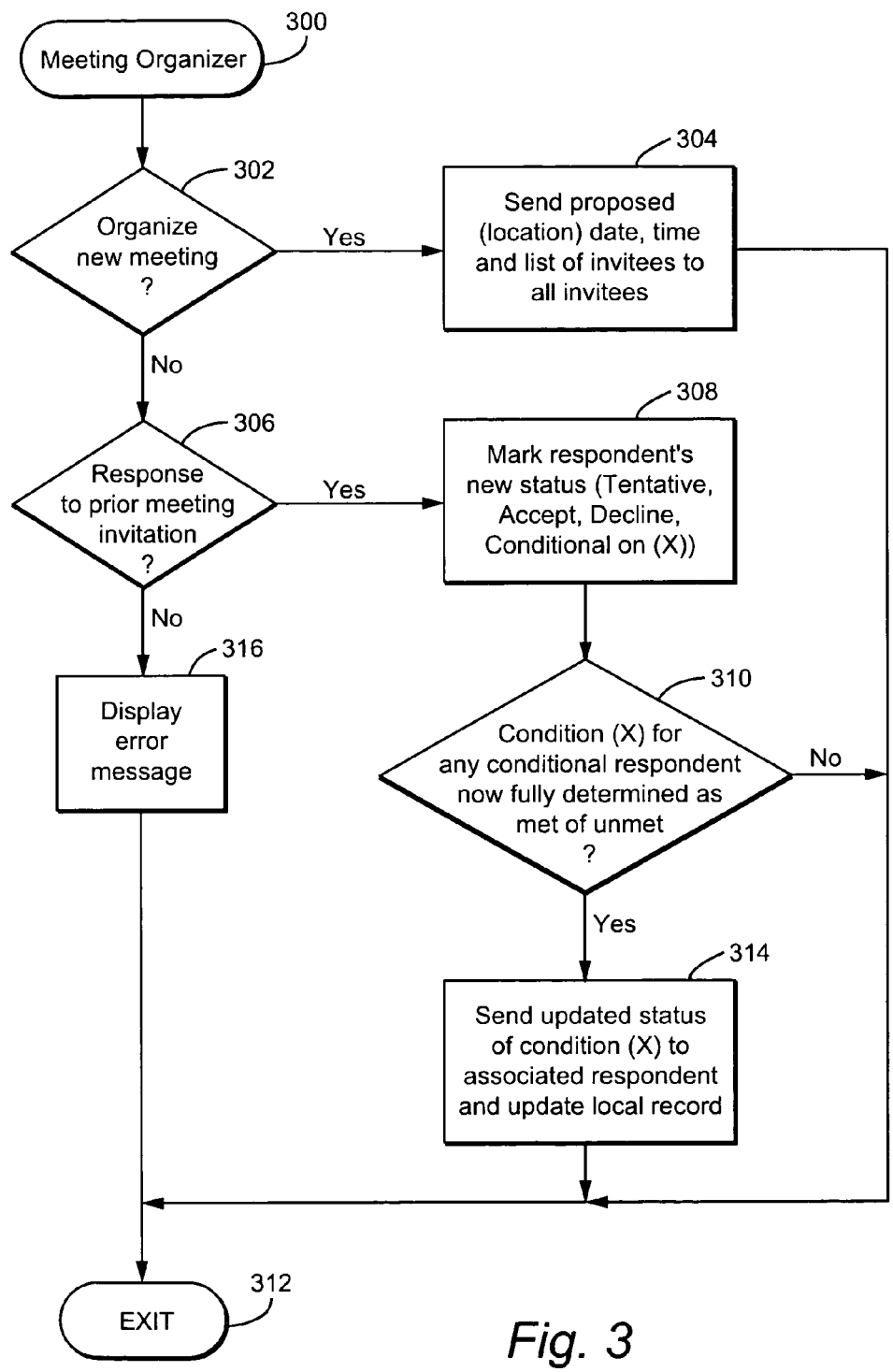
FIG. 3 is an exemplary abbreviated schematic flow chart of computer software (i.e., program logic) that may be utilized in the device of FIG. 2 providing an option to organize a proposed meeting and to handle subsequent conditional acceptances from invitees.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of data memory 11a is available for storing meeting status data. Suitable computer program executable code is stored in portions of program memory 108a to provide the capability to handle conditional acceptance of meeting requests.

If a device user wishes to organize a meeting, then an option is provided to enter the meeting organizer logic 300. Suitable communications handling logic will, in this exemplary embodiment, also direct incoming responses to prior meeting invitations to this same meeting organizer logic 300.

If a new meeting organization request is detected at 302, then proposed meeting data is assembled at 304 and transmitted to devices associated with each of the invitees. For example, proposed meeting location, date, time and list of other invitees may be among the data that is assembled and transmitted to other devices inviting respectively corresponding others to join in the proposed meeting.

If a response to a prior meeting invitation by this user is detected at 306, then at 308 the respondent's new status is noted. Appropriate status data being maintained on the proposed meeting is updated. For example, the incoming response could be a tentative accept, an accept, a decline, or acceptance conditional on some yet to be determined event X (e.g., an acceptance from some other meeting invitee or a failure of acceptance from some other meeting invitee—either by expressly declining or by failure to accept within a certain time window). At 310, a test is made to see whether or not the condition X has been met for any conditional acceptance respondent. That is, a determination is made as to whether the condition(s) X is(are) now fully determined as met or unmet. If not, then the routine is exited at 312. If so, then an updated status of condition(s) X is sent at 314 to associated respondents and the local meeting status data is also suitably updated before exit is taken at 312. If neither expected condition is met at 302 and 306, then a suitable error message is displayed at 316 before exit is taken from this routine at 312.

As shown in FIG. 5, meeting status data may include a meeting ID, the ID of all invitees and their respective statuses. For example, at time T1, a meeting A may be organized by Bob with invitations being sent to Alice, Eve and Carol. At a later time T2, Bob may have received a declined return message from Alice and a Conditional acceptance message from Carol (e.g., Conditional upon whether Eve also accepts). When Eve's response is received at time T3, then if Eve accepts, the status of both Eve and Carol is updated to an acceptance status. However, if Eve declines, then the status of both Eve and Carol is updated to a declined status. As those in the art will appreciate, similar message status data may be maintained in all involved devices.

Figure 4:
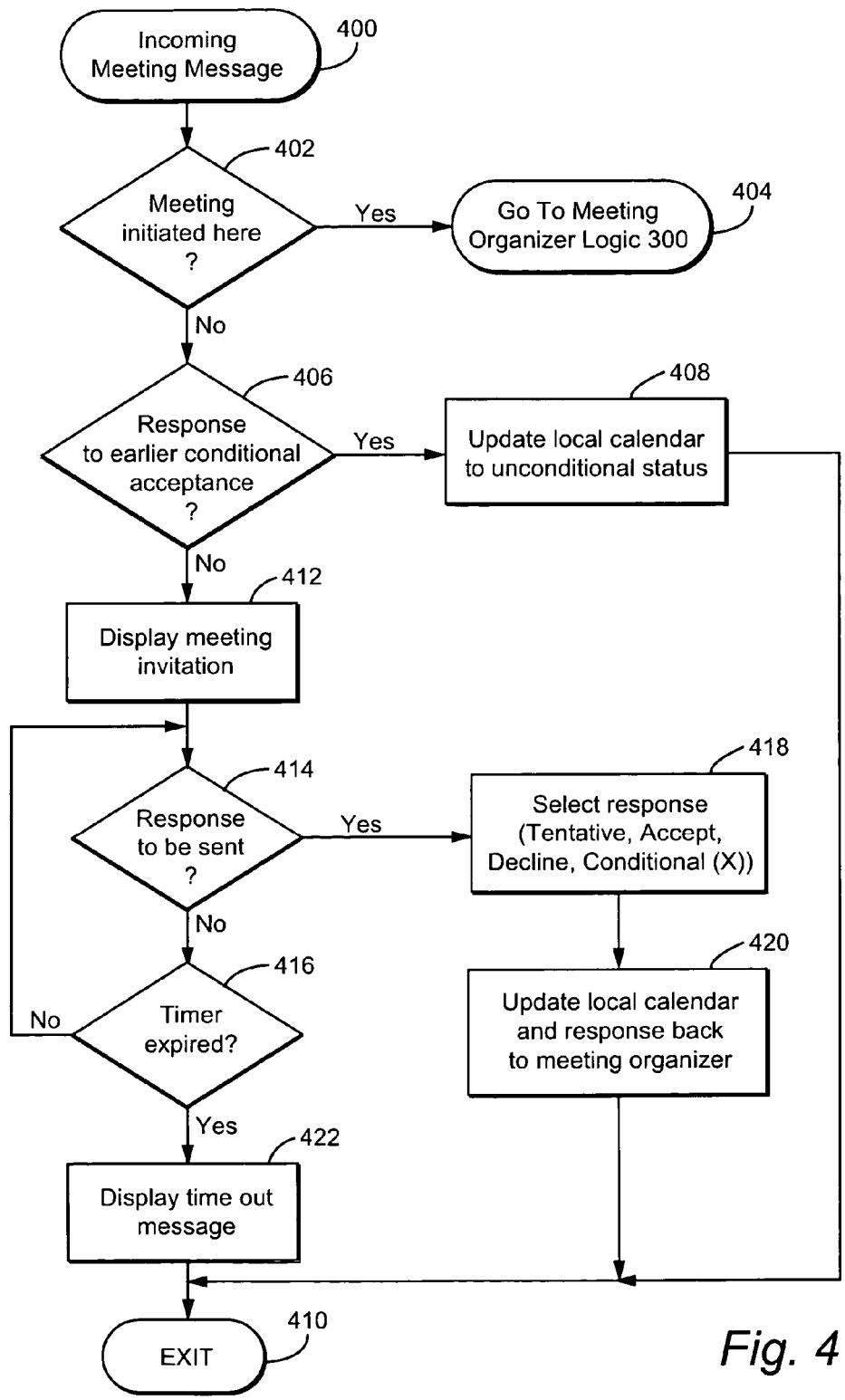
FIG. 4 is an exemplary abbreviated schematic flowchart of computer software (i.e., program logic) that may be utilized in the device of FIG. 2 to provide user ability to respond to a meeting invitation with a conditional acceptance.

If an incoming meeting invitation is detected by the communications handling logic, then control is transferred to the incoming meeting message logic 400 as depicted in FIG. 4. A check is made at 402 to see if the device receiving this message was the meeting organizer. If so, then transfer is made to the meeting organizer logic 300 at 404. If not, then a check is made at 406 to see if the incoming message is in response to an earlier conditional acceptance issued by this particular user device. If so, then the local calendar data is updated at 408 to the appropriate unconditional status before the routine is exited at 410. Otherwise, a new incoming meeting invitation is displayed at 412 and a waiting loop 414, 416 is entered for the user to determine whether a response is to be sent (assuming, for the moment, that this user has not permitted a totally automated response to occur—in which case an appropriate automated response is selected and sent and local calendar data updated in lieu of 414-420). If a response is to be made, then a suitable response is selected at 418 and local calendar data is updated and a suitable responsive message is sent back to the meeting organizer at 420 before the routine is exited at 410. If the user does not make a timely indication of response, then a suitable time out message may be displayed at 422 before the routine is exited at 410. As those in the art will appreciate, if no response was elected, then suitable flags may be set so that this portion of the logic may be re-entered at the user's option to later send a suitable response.

As depicted in FIG. 6, a logical function (LF) determining the Conditional acceptance of party A will involve any desired Boolean logic function of any number of other invitees (B, C . . . ).

Although the above description has been made with respect to the details of exemplary embodiments, those skilled in the art will realize that various modifications and variations may be made in such exemplary embodiments while yet retaining many of the novel features and advantages described herein. Accordingly, all such variations and modifications are intended to be included within the scope of the appended claims.

What is claimed is:

1. A method performed by a user-associated electronic device of an invitee to digitally communicate with other user-associated devices to arrange a meeting between plural users, said method comprising:
   (a) receiving a meeting request for the meeting at the user-associated electronic device of the invitee;
   (b) responding, from the user-associated electronic device of the invitee, to the meeting request, with a conditional acceptance having a condition that at least one of the other user-associated devices of another invitee has sent an acceptance of said meeting request;
   (c) recording the meeting as tentative in a calendar at the user-associated electronic device of the invitee;
   (d) receiving, at the user-associated electronic device of the invitee, a determination whether the condition has been met or not; and
   (e) updating, in the calendar at the user-associated electronic device of the invitee, the meeting as accepted in response to receipt of the determination that the condition has been met.

2. The method as in claim 1 wherein said conditional acceptance is dependent upon satisfying a Boolean logic function of a meeting acceptance status of at least one other meeting invitee.

3. A non-transitory storage medium containing a computer program which, when executed by a processor of a user-associated electronic device, implements a method for operating a user-associated electronic device of an invitee, capable of digitally communicating with other user-associated devices in arranging a meeting between plural users, said method comprising:
   (a) receiving, a meeting request for the meeting at the user-associated electronic device of the invitee;
   (b) responding, from the user-associated electronic device of the invitee, to the meeting request with a conditional acceptance having a condition that at least one of the other user-associated devices of another invitee has sent an acceptance of the meeting request;
   (c) recording, the meeting as tentative in a calendar at the user-associated electronic device of the invitee;
   (d) receiving, at the user-associated electronic device of the invitee, a determination whether the condition has been met or not;
   (e) updating, in the calendar at the user-associated electronic device of the invitee, the meeting as accepted in response to receipt of the determination that the condition has been met.

4. The non-transitory storage medium as claimed in claim 3 wherein said conditional acceptance is dependent upon satisfying a Boolean logic function of a meeting acceptance status of at least one other meeting invitee.

5. The method as claimed in claim 1, comprising deleting the meeting in the calendar at the user-associated electronic device of the invitee in response to receipt of the determination that the condition has not been met.

6. The method as claimed in claim 1, comprising sending a further response, from the user-associated electronic device of the invitee, declining the meeting in response to receipt of the determination that the condition has not been met.

7. The non-transitory storage medium as claimed in claim 3, comprising deleting the meeting in the calendar at the user-associated electronic device of the invitee in response to receipt of the determination that the condition has not been met.

8. The non-transitory storage medium as claimed in claim 3, comprising sending a further response, from the user-associated electronic device of the invitee, declining the meeting in response to receipt of the determination that the condition has not been met.

9. A user-associated mobile communication device for digitally communicating with other user-associated devices in arranging a meeting between plural users, the user-associated device comprising:

an input device for receiving input from the user;
a display device for displaying;
a communication system for wireless communication;
a memory device; and
a processor connected to the input device, the display device, the communication system and the memory device for executing a program stored in the memory device for
  (a) receiving a meeting request for the meeting at the user-associated device,
  (b) responding, from user-associated device, to the meeting request with a conditional acceptance having a condition that at least one of the other user-associated devices of another invitee has sent an acceptance of the meeting request,
  (c) recording the meeting as tentative in a calendar at the user-associated device,
  (d) receiving, at the user-associated device, a determination whether the condition has been met or not,
  (e) updating, in the calendar at the user-associated device, the meeting as accepted in response to receipt of the determination that the condition has been met.

10. The user-associated mobile communication device as claimed in claim 9, wherein the program deletes the meeting in the calendar at the user-associated device in response to receipt of the determination that the condition has not been met.

11. The user-associated mobile communication device as claimed in claim 9, wherein the program stored sends a further response, from the user-associated device, declining the meeting in response to receipt of the determination that the condition has not been met.

* * * * *